Patented Aug. 14, 1951

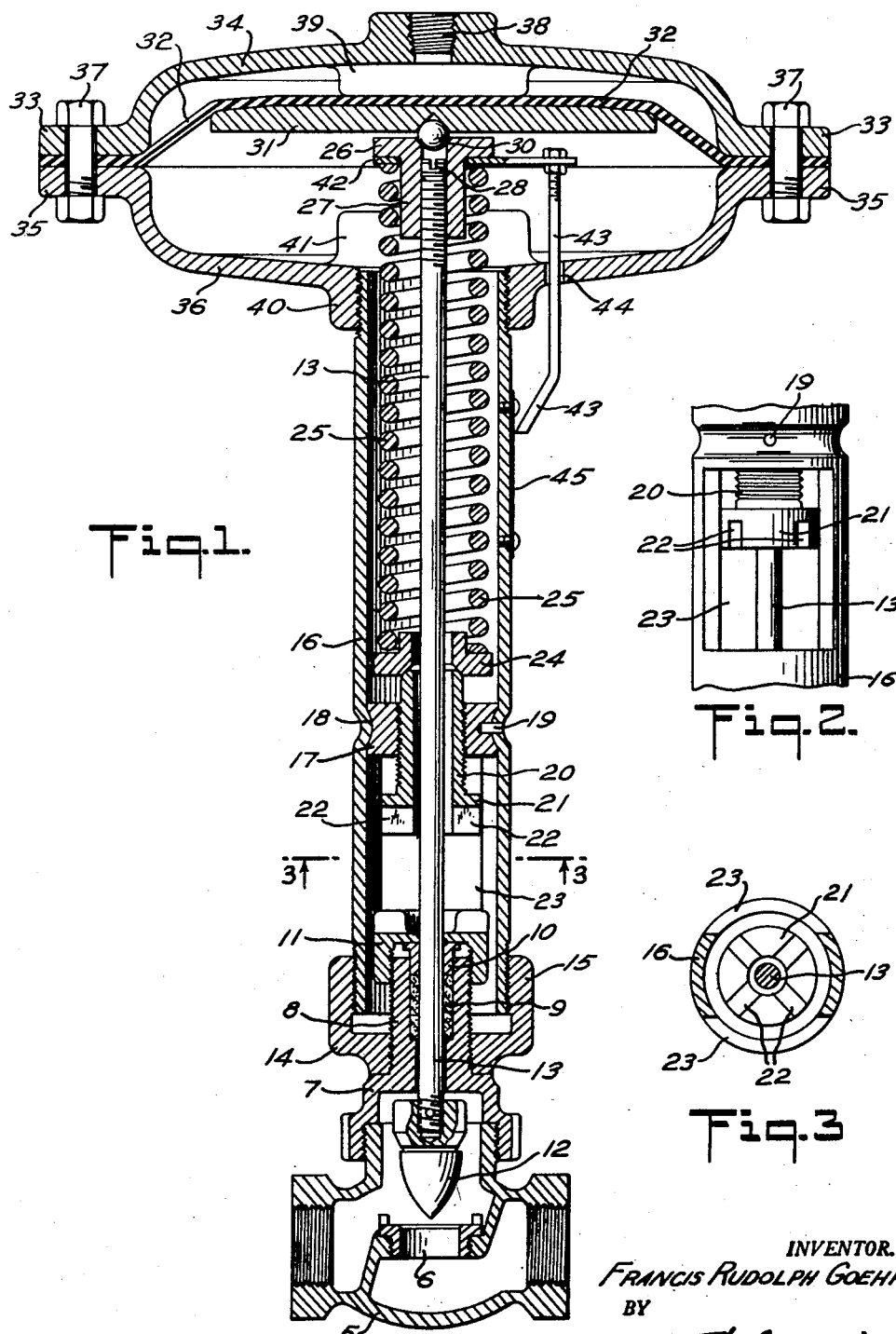

2,564,569

UNITED STATES PATENT OFFICE 2,564,569

DIAPHRAGM CONTROL VALVE

Francis Rudolph Goehring, Philadelphia, Pa., assignor to Minneapolis-Honeywell Regulator Company, Minneapolis, Minn., a corporation of Delaware Application July 13, 1945, Serial No. 604,909

6 Claims. (Cl. 137—139)

This invention relates to diaphragm control valves, and it relates more particularly to that portion of the mechanism of a diaphragm control valve which is ordinarily mounted upon the bonnet of a valve proper for controlling the flow therethrough, and which is responsive to changes in pressure of the fluid used for effecting the control.

The principal object of the present invention is to provide a diaphragm control valve which will be simple and efficient, and which may be inexpensively constructed.

A further object of the invention is to provide a diaphragm control valve which is so constructed and arranged that any tendency of the diaphragm plate to tilt, as the same is actuated, will not be communicated to the valve stem in such manner as to impress a side thrust or bending stress thereon, thereby eliminating the necessity for intermediate guides with the attendant friction, which in some instances seriously interferes with the proper functioning of the control mechanism.

A further object of the invention is to provide a diaphragm control valve which is so constructed and arranged that springs of varying lengths and tension may be readily substituted for each other with relatively simple changes in other parts of the structure, and in this manner making the device available for varying conditions which are encountered in practice.

The nature and characteristic features of the invention will be more readily understood from the following description, taken in connection with the accompanying drawing, forming part hereof, in which:

Figure 1 is a vertical central sectional view of a diaphragm control valve embodying the main features of the present invention, certain of the internal parts being shown in elevation;

Fig. 2 is a fragmentary side elevation of a portion of the structure used for mounting the control mechanism on the valve proper; and Fig. 3 is a horizontal section taken on the line 3—3 of Fig. 1.

It should, of course, be understood that the description and drawing herein are illustrative merely, and that various changes and modifications may be made in the structure disclosed without departing from the spirit of the invention.

Referring to the drawing, the valve proper may be of any preferred construction or type, but as there shown the same comprises a body portion 5 of the usual internal construction of globe valves, but preferably having a renewable seat member 6. The bonnet member 7 is threaded on the upper portion of the valve body 5, extending upwardly into a threaded neck portion 8, which is interiorly recessed to receive the stem packing 9. The packing 9 is compressed by means of a sleeve member 10, which in turn is forced downwardly into the packing recess by means of the gland 11.

The valve member 12 is carried at the lower end of the valve stem 13, and is adapted to be seated on the seat member 6 when the valve stem 13 is brought to its lowermost position to close the valve.

The threaded neck portion 8 of the valve bonnet has an annular member 14 mounted thereon. The member 14 has an upwardly extending sleeve portion 15 interiorly threaded for the mounting therein of the lower end of the upright standard 16. The upright standard 16 is preferably made from a piece of ordinary steel or wrought iron pipe, and the same is provided at each end with standard pipe threads. The parts respectively engaged by the threaded ends of the standard 16 are complementally threaded.

Intermediate the ends of the standard 16, an annular member 17 is interiorly mounted. Said member 17 is secured in a fixed position by any preferred means as, for example, by indenting a portion of the standard 16 in the complementally shaped recess 18 in the annular member 17 and also if desired by means of pins 19.

The annular member 17 is interiorly threaded for the mounting therein of a complementally threaded sleeve 20. The lower end of the sleeve 20 is provided with an enlarged head 21 having transversely extending recesses 22, which are adapted to be engaged by a suitable tool for the purpose of rotating the sleeve 20 to adjust the same upwardly and downwardly. The standard 16 is slotted as at 23 to permit access to the lower or head end 21 of the sleeve member 20 for effecting the adjustments above referred to.

The upper end of the sleeve member 20 supports an annular member 24 which serves as a seat for the lower end of a coil spring 25, being curved to permit the annular member 24 to be self adjusting as to angularity in the event of shifting stresses.

The upper end of the coil spring 25 bears against the flange 26 of a sleeve member 27 in which the upper end of the valve stem 13 is threaded. A plug member 28 is also threaded in the interior of the sleeve member 27, and the same is brought to bear against the upper end of the valve stem 13 to lock the sleeve member in its adjusted position on the upper end of the valve stem.

The upper end of the sleeve member 27 is suitably shaped to provide a seat for a ball member 30 which is preferably made of hardened steel or other suitable material. The ball 30 is free to rotate in all directions and serves as a means for supporting the diaphragm plate 31, engaging a central recess 29 therein, so that the diaphragm plate 31 is permitted to take such angular positions with respect to the upper end of the valve stem as may be impressed upon said diaphragm plate 31 by reason of inequalities of the texture of the diaphragm. The diaphragm 32 extends over the plate 31 and is secured at its peripheral portion between the flange 33 of the upper casing member 34 and the flange 35 of lower casing member 36, bolts 37 being used for securing the said flanges to each other.

The upper casing member 34 is provided with a central aperture 38 interiorly threaded for the connection thereto of the control fluid pipe not shown. The upper casing member 34 may also be provided with the usual internal lugs 39, which serve to limit the upward movement of the diaphragm 32 and the parts controlled thereby.

The lower casing member 36 is provided with a central boss 40 interiorly threaded to engage the threaded upper end of the standard 16. The lower casing member 36 may also be provided with internal lugs 41 to limit the downward movement of the diaphragm 32 and the parts controlled thereby, but this will ordinarily be limited by the seating of the valve member 12.

For the purpose of indicating the position of the valve member 12 within the body 5, a plate member 42 may be interposed between the upper end of the coil spring and the flange 26 of the sleeve member 27, and an indicator finger 43 is secured to an extension of said plate member 42. The indicator finger 43 may extend through a suitable aperture 44 in the lower casing member 36, and the end thereof may extend to a place adjacent a suitably graduated scale plate 45 mounted on the outside of the upright standard 16.

It will be seen that by the foregoing arrangement there is provided a diaphragm control valve, the parts whereof are so constructed and arranged that the same may be inexpensively made, yet will afford considerable flexibility in the use thereof. For example, if it should be desired to shorten the coil spring, this may be readily done by the mere cutting of a suitable length from the standard 16 and rethreading same to engage the lower portion of the diaphragm casing. If, on the other hand, it should be desired to lengthen the coil spring, this may be done by using a longer piece of pipe for the making of the standard 16, or an ordinary pipe nipple and coupling (not shown) may be used for making such an extension.

It will also be noted that, by reason of the provision of the single ball connection between the centre of the diaphragm plate and the spring pressed member, any tendency of the diaphragm plate to tilt by reason of inequalities in the texture of the diaphragm, or from any other cause, will not be communicated to the valve stem in any manner which will cause the same to be displaced side ways, or to bend intermediate its ends, so that the central guides usually provided in structures of this sort, with their attendant friction, may be dispensed with.

Furthermore, by reason of the ball being free to rotate in all directions, wear on the same will be evenly distributed, the ball seats will tend to wear to true spherical shape, and the ball connection will thus be free in its action at all times and will outwear the other parts of the structure.

Also the lack of direct connection between the ball and the valve stem positively eliminates any tendency to bend the valve stem when the diaphragm plate is tilted, and such construction also permits the use of a much smaller ball with considerably more freedom of action at the place where the ball is mounted.

I claim:

1. In a control valve, a valve proper having a valve member movable to and from a seat for controlling fluid flow through said valve, a stem extending from the valve member, and means for controlling the actuation of the valve member including a casing, a flexible diaphragm mounted in said casing and responsive to pressure changes in said casing on one side of said diaphragm, a centrally disposed diaphragm plate for supporting said diaphragm, said diaphragm plate having a central recess, a ball engaging said central recess, said ball being detached from said stem and freely rotatable in all directions, and a spring pressed member supporting said ball.

2. In a control valve, a valve proper having a valve member movable to and from a seat for controlling fluid flow through said valve, said valve having a bonnet portion, a standard extending therefrom, means mounted on said bonnet portion for securing one end of said standard, a stem extending through said bonnet portion from the valve member, a casing mounted at the other end of said standard, a flexible diaphragm mounted in said casing and responsive to pressure changes in said casing on one side of said diaphragm, a centrally disposed diaphragm plate for supporting said diaphragm, said diaphragm plate having a central recess, a ball engaging said central recess, said ball being detached from said stem and freely rotatable in all directions, and a spring pressed member supporting said ball, said ball supporting member being secured to the upper end of the valve stem.

3. In a control valve, a valve proper having a valve member movable to and from a seat for controlling fluid flow through said valve, said valve having a bonnet portion, a standard extending therefrom, means mounted on said bonnet portion for securing one end of said standard, a stem extending through said bonnet portion from the valve member, a casing mounted at the other end of said standard, a flexible diaphragm mounted in said casing and responsive to pressure changes in said casing on one side of said diaphragm, a centrally disposed diaphragm plate for supporting said diaphragm, said diaphragm plate having a central recess, a ball engaging said central recess, said ball being detached from said stem and freely rotatable in all directions, a coacting member supporting said ball, said ball supporting member being secured to the upper end of the valve stem, a coil spring for supporting said ball supporting member, and means interiorly mounted in the standard intermediate the ends thereof for varying the tension of said spring.

4. In a control valve, a valve proper having a valve member movable to and from a seat for controlling fluid flow through said valve, said valve having a bonnet portion, a standard extending therefrom, means mounted on said bonnet portion, for securing one end of said standard, a stem extending through said bonnet portion from the valve member, a casing mounted at the other end of said standard, a flexible diaphragm mounted in said casing and responsive to pressure changes in said casing on one side of said diaphragm, a centrally disposed diaphragm plate for supporting said diaphragm, said diaphragm plate having a central recess, a ball engaging said central recess, said ball being detached from said stem and freely rotatable in all directions, a coacting member supporting said ball, said ball supporting member being secured to the upper end of the valve stem, a coil spring having one end thereof engaging said ball supporting member, another member in which the other end of said coil spring is supported, means interiorly mounted in the standard intermediate the ends thereof for adjustably supporting said spring supporting member.

5. In a control valve, a valve proper having a valve member movable to and from a seat for controlling fluid flow through said valve, said valve having a bonnet portion, a standard extending therefrom, means mounted on said bonnet portion for securing one end of said standard, a stem extending through said bonnet portion from the valve member, a casing mounted at the other end of said standard, a flexible diaphragm mounted in said casing and responsive to pressure changes in said casing on one side of said diaphragm, a centrally disposed diaphragm plate for supporting said diaphragm, said diaphragm plate having a central recess, a ball engaging said central recess, said ball being detached from said stem and freely rotatable in all directions, a coacting member supporting said ball, said ball supporting member being secured to the upper end of the valve stem, a coil spring having one end thereof engaging said ball supporting member, another member in which the other end of said coil spring is supported, and means interiorly mounted in the standard intermediate the ends thereof for adjustably supporting said spring supporting member, the standard comprising a piece of ordinary pipe having suitable openings cut therein to afford access to the spring supporting means to adjust the same.

6. In a control valve, a valve proper having a valve member movable to and from a seat for controlling fluid flow through said valve, said valve having a bonnet portion, a standard extending therefrom, means mounted on said bonnet portion for securing one end of said standard, a stem extending through said bonnet from the valve member, a casing mounted at the other end of said standard, a flexible diaphragm mounted in said casing and responsive to pressure changes in said casing on one side of said diaphragm, a centrally disposed diaphragm plate for supporting said diaphragm, said diaphragm plate having a central recess, a ball engaging said central recess, said ball being detached from said stem and freely rotatable in all directions, a coacting member supporting said ball, said ball supporting member being secured to the upper end of the valve stem, a coil spring having one end thereof engaging said ball supporting member, another member in which the other end of said coil spring is supported, and means interiorly mounted in the standard intermediate the ends thereof for adjustably supporting said spring supporting member, the standard comprising a piece of ordinary pipe threaded at each end in the connected parts and having suitable openings cut therein to afford access to the spring supporting means to adjust the same.

FRANCIS RUDOLPH GOEHRING.

REFERENCES CITED

The following references are of record in the file of this patent:

UNITED STATES PATENTS

| Number | Name | Date |
|---|---|---|
| 750,752 | Cole | Jan. 26, 1904 |
| 796,959 | Croslen | Aug. 8, 1905 |
| 1,609,879 | Messmer | Dec. 7, 1926 |
| 1,665,443 | Cannon | Apr. 10, 1928 |
| 1,711,443 | Boger | Apr. 30, 1929 |
| 1,934,982 | Jones | Nov. 14, 1933 |
| 1,990,576 | Vincent | Feb. 12, 1935 |
| 2,079,579 | Shrode | May 4, 1937 |
| 2,270,037 | Corbin | June 13, 1942 |